US008009773B1

(12) United States Patent
Kankipati et al.

(10) Patent No.: US 8,009,773 B1
(45) Date of Patent: Aug. 30, 2011

(54) LOW COMPLEXITY IMPLEMENTATION OF A VITERBI DECODER WITH NEAR OPTIMAL PERFORMANCE

(75) Inventors: Sriram Kankipati, Andhra Pradesh (IN); Kaushik Barman, Andhra Pradesh (IN); Krushna Prasad Ojha, Andhra Pradesh (IN)

(73) Assignee: Hellosoft India Pvt. Ltd., Hyderabad (IN)

( * ) Notice: Subject to any disclaimer, the term of this patent is extended or adjusted under 35 U.S.C. 154(b) by 755 days.

(21) Appl. No.: 12/080,597

(22) Filed: Apr. 4, 2008

(51) Int. Cl.
*H04L 27/06* (2006.01)

(52) U.S. Cl. ........ 375/341; 375/316; 375/340; 375/342; 375/346; 375/350; 714/795; 714/796

(58) Field of Classification Search ............... 375/259, 375/260, 265, 292, 295, 299, 316, 322, 327, 375/340, 341–343, 359, 350, 306, 346, 360
See application file for complete search history.

(56) References Cited

U.S. PATENT DOCUMENTS

| | | | |
|---|---|---|---|
| 7,050,517 B1 * | 5/2006 | Sallaway et al. ............... | 375/350 |
| 7,336,735 B2 | 2/2008 | Traeber | |
| 7,581,160 B2 * | 8/2009 | Chen et al. ............... | 714/795 |
| 7,765,459 B2 * | 7/2010 | Chae et al. ............... | 714/795 |
| 7,856,591 B2 * | 12/2010 | Shi et al. ............... | 714/795 |
| 2002/0053061 A1 * | 5/2002 | Kong et al. ............... | 714/796 |
| 2007/0168845 A1 * | 7/2007 | Endo et al. ............... | 714/795 |

* cited by examiner

*Primary Examiner* — Shuwang Liu
*Assistant Examiner* — Hirdepal Singh
(74) *Attorney, Agent, or Firm* — William L. Botjer

(57) ABSTRACT

A method and system for low-complexity implementation of a Viterbi Decoder with near optimal performance has been disclosed. The Viterbi decoding technique is diagrammatically represented as a trellis. The trellis includes various states at different time instants, and branches connecting these states. Each state has an associated state metric and a survivor path sequence, whereas each branch has a branch metric. The state metric for each current state is checked for crossing a predefined limit. If it crosses the predefined limit, the state metric is updated with a new metric that is obtained by subtracting a constant value from the state metric. Thereafter, the method finds a common path in the trellis at each state and updates the survivor path sequence of each state. The Most Significant Bits (MSBs) of the survivor path sequences of the states at a particular time instant are computed and the original data is decoded, based on the count of '0s' and '1s' in the MSBs.

19 Claims, 11 Drawing Sheets

| T | 0 | 1 | 2 | 3 | 4 | 5 | 6 | 7 | 8 | 9 | 10 |
|---|---|---|---|---|---|---|---|---|---|---|---|
| Received Channel Symbol Pair | 11 | 10 | 01 | 01 | 01 | 00 | 01 | 10 | 01 | 11 | 11 |
| Confidence Match | 0.01, 0.04 | 0.01, 0.01 | 0.04, 0.01 | 0.04, 0.04 | 0.09, 0.01 | 0.04, 0.01 | 0.25, 0.25 | 0.04, 0.04 | 0.04, 0.09 | 0.01, 0.01 | 0.04, 0.01 |
| Confidence Mismatch | 3.61, 3.24 | 4.41, 3.61 | 3.24, 1.21 | 3.24, 3.24 | 2.89, 3.61 | 3.24, 4.41 | 2.25, 2.25 | 4.84, 3.24 | 4.84, 5.29 | 4.41, 3.61 | 3.24, 3.61 |
| Branch Metric for each bit pair — 00 | 6.85 | 4.42 | 1.25 | 3.28 | 3.70 | 0.05 | 2.50 | 4.92 | 5.33 | 8.02 | 6.85 |
| 01 | 3.65 | 8.02 | 0.05 | 0.08 | 0.10 | 4.45 | 0.50 | 8.08 | 0.13 | 4.42 | 3.65 |
| 10 | 3.25 | 0.02 | 4.45 | 6.48 | 6.50 | 3.25 | 4.50 | 0.08 | 10.13 | 3.62 | 3.25 |
| 11 | 0.05 | 3.62 | 3.25 | 3.28 | 2.90 | 7.65 | 2.50 | 3.28 | 4.93 | 0.02 | 0.05 |

FIG. 3

LOW COMPLEXITY IMPLEMENTATION OF A VITERBI DECODER WITH NEAR OPTIMAL PERFORMANCE

BACKGROUND OF THE INVENTION

The present invention relates to techniques for decoding data in digital communication systems. More specifically, the present invention relates to an improved technique for decoding convolutional encoded data by using the Viterbi algorithm.

Digital communication systems, such as digital radios, mobile phones, satellite links and bluetooth implementation, employ numerous coding techniques for transmitting data through noisy communication channels. These coding techniques enhance the noise immunity of the original data during the transmission. One such coding technique is 'convolutional coding'. The convolutional coding technique encodes an m-bit data to an n-bit data, where m is less than n, and then transmits the n-bit data to a receiver. To recover the original data with the receiver, the convolutional encoded data is decoded by using various decoding techniques.

One of the decoding techniques for the convolutional encoded data is Viterbi decoding. The Viterbi decoding provides a high degree of likelihood that the original data corresponds to the encoded data received. This technique involves the generation of possible data sequences that are estimates of the original data. A data sequence that is closest to the original data is selected from the possible data sequences, on the basis of certain predefined parametric conditions. The selected data sequence can then be decoded.

The Viterbi decoding algorithm involves locating a common path at every instant in a trellis. The trellis is a state diagram that includes different states at various time instants, which are represented as nodes. An example of the trellis is shown in FIG. 2. Trace back is performed from all the nodes at every instant to locate a common path. Once the common path is obtained, the selected data sequence at the node is decoded. If a common path is not obtained at a particular instant, the next time instant is traced back to locate a common path. This trace-back decoding method results in variable latencies at different time instants. Problems related to variable latency can be resolved by starting decoding of the bits after a sufficient number of time instants are completed. The number of time instants completed in the trellis before the starting of the decoding process is known as the trace-back depth. Several resources, such as registers, comparators, adders and other electronic circuits, are used to trace back the maximum likelihood path. Therefore, the trace-back depth needs to be selected in such a way that decoding of data sequences is achieved with the minimal use of the resources required for decoding, with there being no significant deterioration in performance. The probability of all the possible paths having identical decoded data sequences increases with an increase in the trace-back depth.

There are different methods for tracing back in the trellis to decode convolutional encoded data. Two such methods include the fixed node method and the minimum metric node method. In the fixed node method, the trace-back depth is selected for a large number of time instants, to decode a data sequence. However, an increase in the trace-back depth increases decoding latency and the resources required to store the information bits corresponding to the common path. On the other hand, the minimum metric node method selects a node with the minimum metric value. The metric value is an accumulation of a predefined parametric value for each branch in the path. Finding the minimum metric node reduces the trace-back depth, and hence, the need for the resources required to store the possible paths. However, additional resources such as comparators are needed to locate the node with the minimum metric value.

Therefore, there exists a need for a method for reducing the trace-back depth to conserve resources. Additionally, a need exists for a method for performing decoding with minimum latency, without using comparators. There also exists a need for the low complexity implementation of a Viterbi Decoder with near optimal performance.

SUMMARY

An object of the present invention is to provide an implementation of a Viterbi Decoder with near optimal performance.

Another object of the present invention is to provide a decoding method with minimum latency.

Yet another object of the present invention is to provide a decoding method that utilizes minimum resources.

Still another object of the present invention is to provide a low-complexity implementation of the Viterbi decoding method.

Various embodiments of the present invention provide a method and system for implementing a low complexity Viterbi decoding technique in a communication system. The technique can be presented in the form of a trellis. This trellis includes various states at different time instants. Each state has an associated state metric value, an accumulated metric of the path and information bits corresponding to the survivor path sequence, which is stored in a data path register. A path connecting two states at different time instances is known as a branch. Each branch has an associated branch metric value. The technique provides a method for locating a survivor path connecting a state at each time instant in the trellis. The informational bits corresponding to the survivor path are stored in the data path register of each state. After a predefined number of time instants, the Most Significant Bits (MSBs) of the survivor path sequences of all the states at that time instant are checked for the count of assertive and de-assertive bits. On the basis of the majority count of the assertive and de-assertive bits, an output bit is generated. This output bit is one of the decoded bits, which correspond to the original bit that was earlier encoded at the predefined time instant.

BRIEF DESCRIPTION OF THE DRAWINGS

The preferred embodiments of the invention will hereinafter be described in conjunction with the appended drawings that are provided to illustrate and not to limit the invention, wherein like designations denote like elements, and in which:

FIG. 3 depicts a branch metrics table illustrating one of the methods for calculating the branch metrics of a trellis, in accordance with an embodiment of the present invention;

DESCRIPTION OF PREFERRED EMBODIMENTS

Various embodiments of the present invention provide a method and system for decoding the convolutional encoded data in a transmitted data stream through a noisy communication channel.

Figure 1:
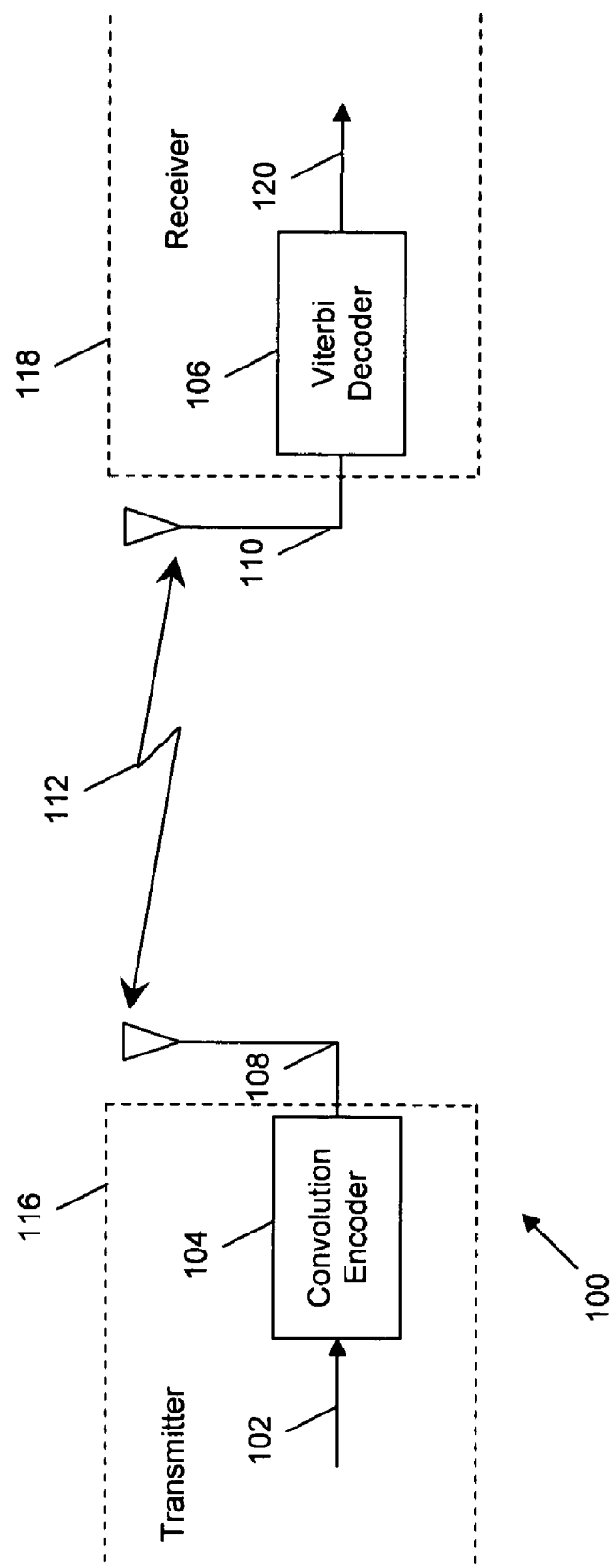
FIG. 1 depicts an environment where various embodiments of the present invention can be practiced.

FIG. 1 depicts an environment where various embodiments of the present invention can be practiced. In a communication system 100, data is transferred from a transmitter 116 to a receiver 118 through a noisy communication channel 112. Communication system 100 can be a mobile phone, a digital radio, a satellite link, a Bluetooth implementation, and so forth. Transmitter 116 of communication system 100 includes a convolution encoder 104, and Receiver 118 of communication system 100 includes a Viterbi Decoder 106. Convolution encoder 104 encodes a data stream received via a path 102, hereinafter referred to as 'original data stream 102'. Original data stream 102 includes the original data that needs to be transmitted to receiver 118. In an embodiment of the present invention, receiver 118 is placed at a remote location with respect to convolution encoder 104 of transmitter 116. In another embodiment of the present invention, receiver 118 is placed at close proximity to convolution encoder 104 of transmitter 116. Convolution encoder 104 transmits the encoded data stream through an antenna 108. The transmitted data stream passes through a communication channel 112. In an embodiment of the present invention, communication channel 112 can be wired, wireless, or both. The transmitted data stream is received by an antenna 110 of receiver 118. Antenna 110 is connected to Viterbi Decoder 106 of receiver 118. Viterbi Decoder 106 decodes the encoded data stream and outputs original data stream 102 via path 120.

Figure 2:
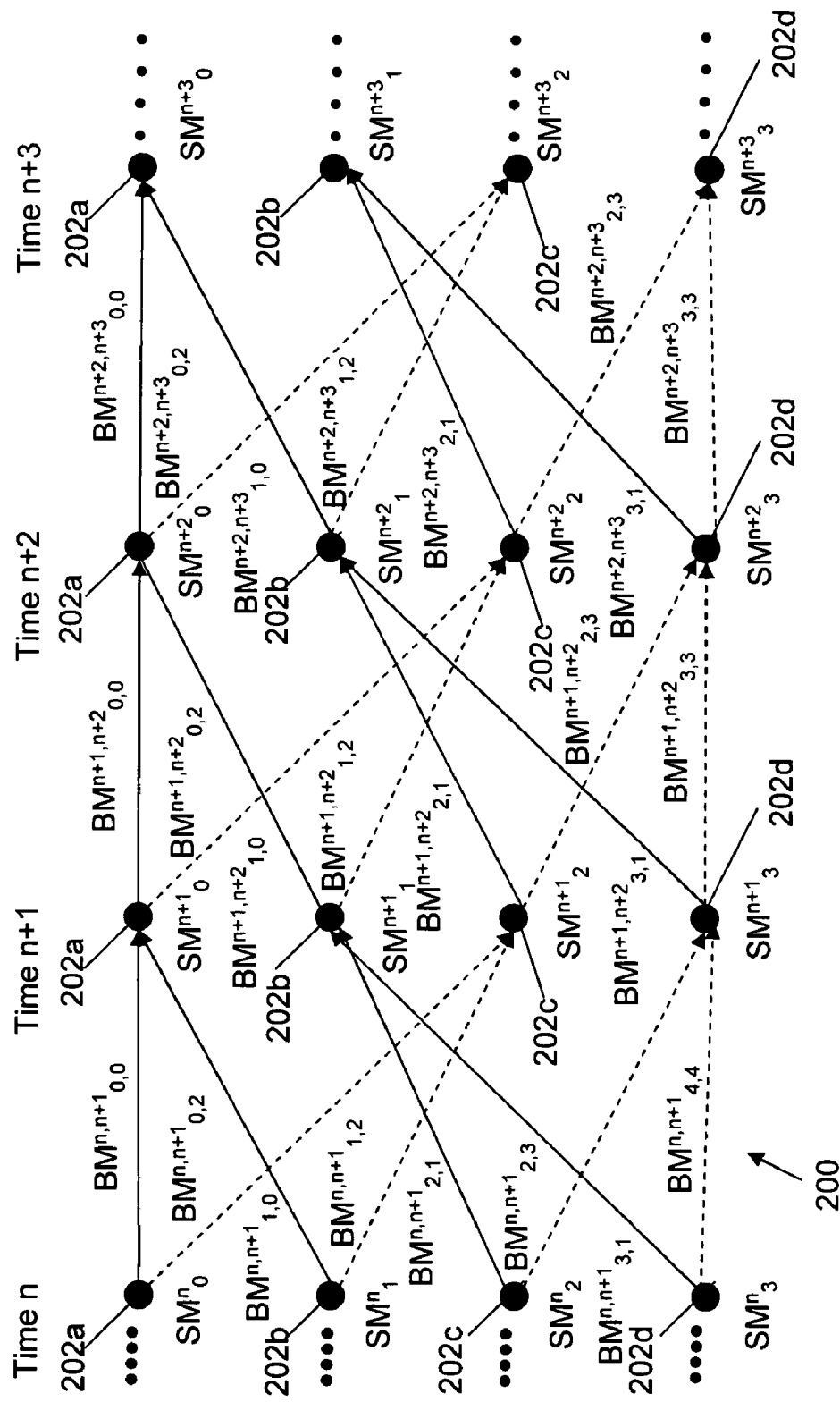
FIG. 2 depicts a trellis illustrating the steps of the decoding process performed by a Viterbi Decoder, in accordance with an embodiment of the present invention.

FIG. 2 depicts a trellis 200 that illustrates the steps of the decoding process performed by Viterbi Decoder 106, in accordance with an embodiment of the present invention. Trellis 200 depicts the graphical representation of the decoding process over different time instants.

Trellis 200 can comprise more than one node at each time instant. In accordance with an embodiment of the present invention, for the purpose of illustration, let us consider 4-state Trellis 200 of convolution encoder 104 that comprises four nodes, 202a, 202b, 202c and 202d, at each time instant, starting from time instant 'n'. In an embodiment of the present invention, convolution encoder 104 is a ½ rate convolution encoder, which transmits two channel symbols per input data bit to receiver 118. Nodes 202a-d are known as states 0-3 of trellis 200, respectively. The connections between states 0-3 at a time instant and corresponding states 0-3 at the next time instant are known as branches. Since the first time instant of trellis 200 represents the initial condition of convolution encoder 104, state transitions that occur at states 0-3 at time instant 'n' to corresponding states 0-3 at time instant 'n+1' represent one bit input to convolution encoder 104. The branches shown with dark lines and those shown with dotted lines depict the transition of states due to the '0' and '1' bit inputs to convolution encoder 104, respectively.

Each branch illustrating a state transition from a state at a time instant to another state at the next time instant corresponds to a branch metric. '$BM^{n,n+1}_{0,0}$' is a symbolic representation of the branch metric of a transition from state '0' at time instant 'n' to state '0' at time instant 'n+1'. A branch metric is calculated on the basis of a bit match and a bit mismatch confidence level of a received channel symbol pair and a possible channel symbol pair. In accordance with an embodiment of the present invention, a transition from state '0' at time instant 'n' to state '0' at time instant 'n+1' is assigned a possible channel symbol pair '$b_{r0}b_{r1}$'. For exemplary purposes, let us assume that the received channel symbol pair is '$b_0 b_1$'. Additionally, first and second bit, match or mismatch confidence-level metrics are defined on the basis of a received channel symbol pair. The first and second bits of the possible channel symbol pair are compared to the first and second bits of the received channel symbol pair, respectively. On the basis of this comparison, the first bits match or mismatch metric and second bits match or mismatch metric are identified. The two identified metrics are added to provide a branch metric for the transition. In accordance with an embodiment of the present invention, the detailed description of a method for calculating branch metrics is provided in FIG. 3.

A state metric is associated with each state at each time instant. For example, '$SM^n_0$' is a symbolic representation of a state metric of state '0' at the $n^{th}$ time instant. In accordance with an embodiment of the present invention, the state metric of a state in trellis 200 is calculated, based on a combination of the branch metric of the branch connecting a prior state to the current state, and the state metric of the prior state. Since more than one branch converges to a particular state, there can be more than one possible state metric of a particular state at any time instant. Of these possible state metrics, only the least state metric is assigned to the particular state.

In accordance with an embodiment of the present invention, the state metric of a state of trellis 200 is calculated on the basis of the least accumulated metric. The accumulated metrics of all the paths that reach the state of trellis 200 are obtained by adding the branch metrics of the branches that reach the state to the respective state metrics of the prior states.

FIG. 3 depicts a branch metrics table 300 illustrating one of the methods for calculating the branch metrics of trellis 200, in accordance with an embodiment of the present invention. Row 302 depicts various time instants, from T=0 to T=10. Row 304 depicts a received channel symbol pair at various time instants. Rows 306 and 308 depict the respective confidence match and mismatch values of the received channel symbol pair and the possible channel symbol pair. Row 310 depicts the calculated branch metrics of the four possible channel symbol pairs, i.e., '00', '01', '10' and '11'. Column 312 depicts the possible channel symbol pairs, i.e., '00', '00', '10', and '11'.

In accordance with an embodiment of the present invention, if the received channel symbol pair is '11' at time T=0, and the possible channel symbol pair is '10', the first bit confidence match value is '0.01'. Similarly, the second bit confidence mismatch value is '3.24'. Adding the first bit confidence match and the second bit confidence mismatch values results in a branch metric value of '3.25' for transition from the received channel symbol pair '11' to the possible channel symbol pair '10'. Similarly, if the received channel symbol pair is '11' at time T=0, and the possible channel symbol pair is '11', the first bit confidence match value is '0.01', whereas the second bit confidence match value is '0.04'. Adding the first bit confidence match and the second bit confidence match values results in a branch metric value of '0.05' for transition from the received channel symbol pair '11' to the possible channel symbol pair '10'. In the same way, the branch metric can be calculated for each branch of trellis 200.

In accordance with an embodiment of the present invention, the method for computing branch metrics of trellis 200 can be generalized in the form of the following equation:

$$\Gamma_k = \overline{e}_0 * \mu_0 + e_0 * \mu_0^c + \overline{e}_1 * \mu_1 + e_1 * \mu_1^c$$

where, '$\Gamma_k$' is the branch metric value of a branch when $k=2b_{r1}+b_{r0}$. Here, '$b_{r0}$' and '$b_{r1}$' are the first and second bits, respectively, of the possible channel symbol pair of the branch. Let '$b_0$' and '$b_1$' be the first and second bits, respectively, of the received channel symbol pair. Further, '$\mu_0$', '$\mu_0^c$', '$\mu_1$' and '$\mu_1^c$' are metrics corresponding to the received channel symbol pair. For example, in accordance with an embodiment of the present invention, '$\mu_0$', '$\mu_0^c$', '$\mu_1$' and '$\mu_1^c$' represent the first bit confidence match value, the first bit confidence mismatch value, the second bit confidence match value and the second bit mismatch value, respectively. In addition, '$e_0$' and '$e_1$' are calculated by using the following formula:

$$e_0 = XOR(b_0, b_{r0})$$

$$e_1 = XOR(b_1, b_{r1})$$

where, 'XOR' represents the exclusive disjunction operation on logical values. In the equations above, '$\overline{e}_0$' and '$\overline{e}_1$' represent one's complement of '$e_0$' and '$e_1$', respectively.

Figure 4:
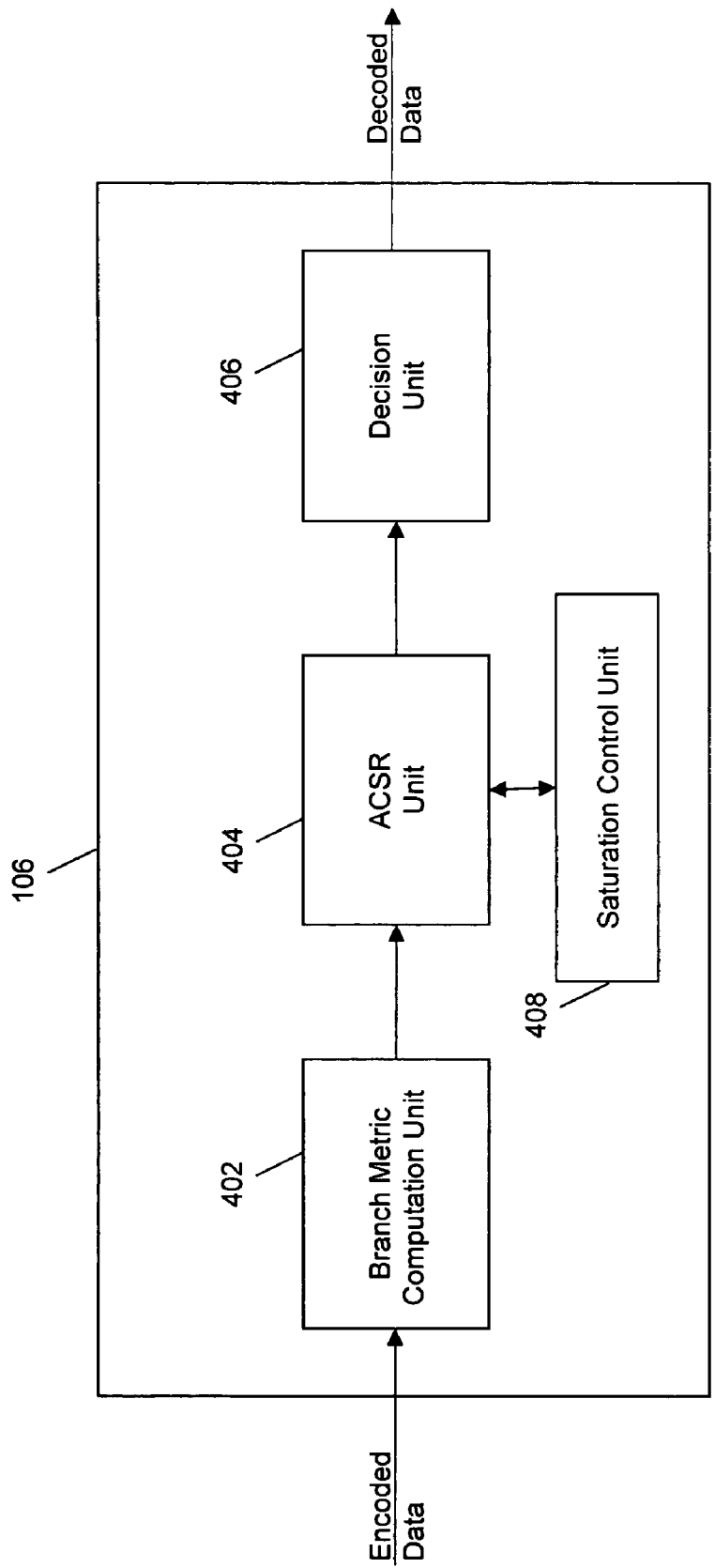
FIG. 4 is a block diagram of a Viterbi Decoder, in accordance with an embodiment of the present invention.

FIG. 4 is a block diagram of Viterbi Decoder 106, in accordance with an embodiment of the present invention. Viterbi Decoder 106 includes a branch metric computation (BMC) unit 402, an Add-Compare-Select and Register Exchange (ACSR) unit 404, a decision unit 406 and a saturation control unit 408. All the computations performed by BMC 402, ACSR 404 and decision unit 406 are graphically represented by trellis 200. BMC unit 402 calculates the branch metric of each branch of trellis 200. ACSR unit 404 calculates the possible state metrics of each state in trellis 200 by performing the add-compare-select operations on a state metric of a prior state, and a branch metric corresponding to a transition from the prior state to the next state. For example, in conjunction with FIG. 2, two possible state metrics can be generated from state '0' at time instant 'n+1', one by combining $BM^{n,}_{n+1_{0,0}}$ and $SM^n_0$, and the other by combining $BM^{n,n+1}_{1,0}$ and $SM^n_1$. The least of these two possible state metrics is considered to be the $SM^{n+1}_0$ of the state '0' at time instant 'n+1'.

ACSR unit 404 also stores informational bits that correspond to a survivor path sequence. A survivor path sequence is a bit pattern that records the state transitions that occur while various states of trellis 200 are traversed. ACSR unit 204 provides a state metric for a current state of trellis 200, based on the add-compare-select operations. A detailed description of ACSR unit 404 is provided in conjunction with FIG. 5.

Saturation control unit 408 checks whether the state metrics of all the states at each time instant are less than a predefined limit. If any state metric crosses the predefined limit, a constant value is subtracted from all the state metrics. This constant value is a predefined value. In accordance with an embodiment of the present invention, the constant value is selected in a manner such that the minimum state metric at each time instant is greater than or equal to zero after subtracting the constant value from the minimum state metric.

Decision unit 406 decodes the input data at each prior state, based on the count of assertive and de-assertive bits in the Most Significant Bits (MSBs) of the survivor path sequences of the current states of trellis 200. In an embodiment of the present invention, the assertive bits are '1s' and the de-assertive bits are '0s'. The prior states are at a pre-determined time interval from the current states of trellis 200.

Figure 5:
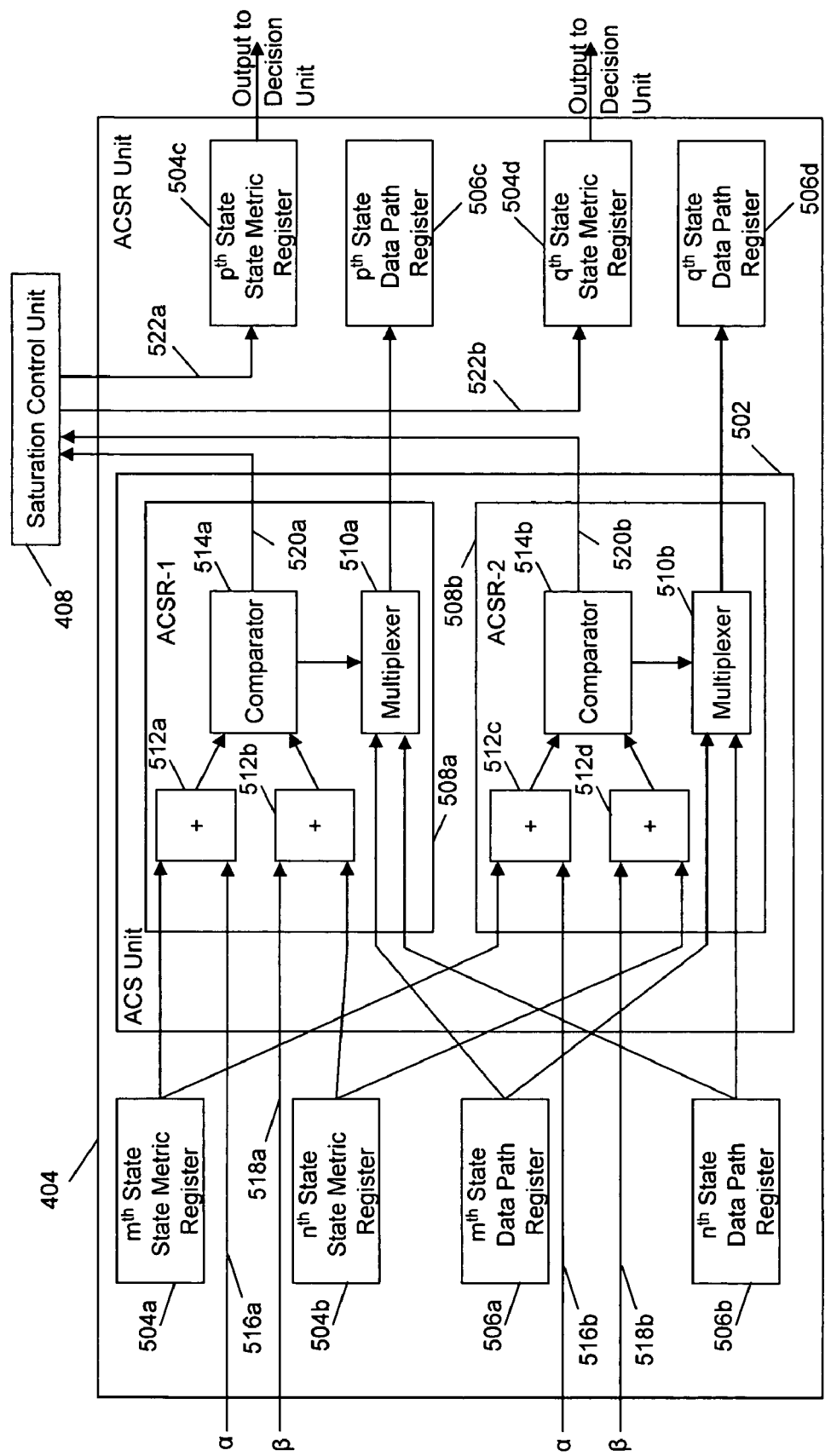
FIG. 5 is a detailed block diagram of an Add-Compare-Select and Register Exchange (ACSR) unit, in accordance with an embodiment of the present invention.

FIG. 5 is a detailed block diagram of ACSR unit 404, in accordance with an embodiment of the present invention. ACSR unit 404 includes an Add-Compare-Select (ACS) unit 502 and multiple Register Exchange units 504 and 506. ACS unit 502 performs the add-compare-select operations by using ACSR-1 unit 508a and ACSR-2 unit 508b. ACSR-1 unit 508a includes two adders 512a and 512b, a comparator 514a and a multiplexer 510a. Similarly, ASCR-2 unit 508b includes two adders 512c and 512d, a comparator 514b and a multiplexer 510b. Adders 512 a-d are hereinafter referred to as adders 512. ACSR-1 unit 508a differs from ACSR-2 unit 508b with respect to its output bits.

In accordance with an embodiment of the present invention, ACSR-1 unit 508a produces an assertive output bit, whereas ACSR-2 unit 508b produces a de-assertive output bit. Register exchange units 504 and 506 consist of multiple State Metric Registers (SMRs) 504a, 504b, 504c and 504d, and Data Path Registers (DPRs) 506a, 506b, 506c and 506d. Each SMR 504a-d and each DPR 506a-d stores informational bits that correspond to the state metric and survivor path sequence, respectively.

In accordance with an embodiment of the present invention, $m^{th}$ state SMR 504a and $n^{th}$ state SMR 504b contain the state metrics of the $m^{th}$ and $n^{th}$ states, respectively. Let us denote $m^{th}$ state SMR 504a by $a_m$, and $n^{th}$ state SMR 504b by $a_n$. On receiving a de-assertive input bit, the $m^{th}$ and the $n^{th}$ states reach the $p^{th}$ state, whereas on receiving an assertive input bit, they reach the $q^{th}$ state. $\alpha$ and $\beta$ denote branch metric inputs to ACS unit 502 from BMC unit 402, where $\alpha$ and $\beta$ can take one of the possible branch metric values, depending on the prior state and the current state.

In ACSR-1 unit 508a, adders 512a and 512b compute the updated state metrics ($a_m+\alpha$, $a_n+\beta$) and feed the computed values to their corresponding comparator 514a. Comparator 514a finds the minimum value between state metrics ($a_m+\alpha$) and ($a_n+\beta$) and sends this value to saturation control unit 408 via 520a.

Saturation control unit 408 checks whether the received value is crossing a predefined limit. In accordance with an embodiment of the present invention, a particular bit position of the received value is checked to determine whether the received value has crossed the predefined limit. If the received value crosses the predefined limit, a constant value is subtracted from the received value. Saturation control unit 408 sends the difference between the received value and the constant value to $p^{th}$ state SMR 504c via path 522a. $p^{th}$ state SMR 504c stores the received value as the current state metric.

In accordance with an embodiment of the present invention, saturation control unit 408 checks whether each value received from comparators 514a and 514b has crossed a predefined limit at each time instant. If any of the received values crosses the predefined limit, saturation control unit 408 subtracts a constant value from all the received values and sends the subtracted values to respective SMRs 504c and 504d. If none of the received values crosses the predefined limit, saturation control unit 408 sends the received values to respective SMRs 504c and 504d without any value change. In accordance with an embodiment of the present invention, saturation control unit 408 selects the control value in a manner such that the minimum received value is greater than or equal to zero after subtracting the control value from the minimum received value.

In ACSR 404, $p^{th}$ state DPR 506c and $q^{th}$ state DPR 506d store informational bits corresponding to the survivor path sequence that reaches the $p^{th}$ state and the $q^{th}$ state, respectively. If the received input bit is a de-assertive bit, multiplexer 510a selects $m^{th}$ state DPR 506a or $n^{th}$ state DPR 506b, depending on the least input values received from comparator 514a and updates $p^{th}$ state DPR 506c with the de-assertive bit in ACSR-1 unit 508a. However, if the received bit is an assertive bit, multiplexer 510b selects $m^{th}$ state DPR 506a or $n^{th}$ state DPR 506b, depending on the least input values from comparator 514b, and updates $q^{th}$ state DPR 506d with the assertive bit in ACSR-2 unit 508b.

ACSR-2 unit 508b performs the same operations as ACSR-1 unit 508a, except that ACSR-2 unit 508b updates $q^{th}$ state DPR 506d with an assertive bit. In ACSR-2 unit 508b, adders 512c and 512d compute the updated state metrics ($a_m+\alpha$, $a_n+\beta$) and feed the computed values to their corresponding comparator 514b. Comparator 514b finds the minimum value between state metrics ($a_m+\alpha$) and ($a_n+\beta$) and sends this value to saturation control unit 408 via 520b.

Saturation control unit 408 checks whether the received value is crossing a predefined limit. In accordance with an embodiment of the present invention, a particular bit position of the received value is checked to determine whether the received value has crossed the predefined limit. If the received value crosses the predefined limit, a constant value is subtracted from the received value. Saturation control unit 408 sends the difference between the received value and the constant value to CO state SMR 504d via path 522b. $q^{th}$ state SMR 504d stores the received value as the current state metric.

In accordance with an embodiment of the present invention, TY denotes a trace-back depth. The trace-back depth is defined as the number of time instants completed in trellis 200 before the decoding process starts. The informational bits are stored in DPRs 506a and 506b as $\{d_{p,D-1}, d_{p,D-2}, d_{p,D-3}, \ldots d_{p,2}, d_{p,1}, d_{p,0}\}$. '$d_{p,0}$' is the informational bit placed in DPRs 506a and 506b at the current time instant. '$d_{p,D-1}$' is an informational bit stored in the 'D' time instants earlier.

Decision unit 406 reads the Most Significant Bits (MSBs) of all the Data Path Registers at the current time instant. For example, decision unit 406 reads the MSB of DPR 506c, i.e., at the current time instant the MSB is '$d_{p,D-1}$'. The current time instant is chosen after the pre-determined trace-back depth. In accordance with an embodiment of the present invention, the pre-determined trace-back depth is equal to the length of each DPR 506a-d. Once the MSBs from DPRs 506 a-d of all the states are read, decision unit 406 computes the number of assertive and de-assertive bits in the read MSBs. If the count of the assertive bits is more than the count of the de-assertive bits, decision unit 406 produces a decoded output as an assertive bit. However, if the count of the de-assertive bits is more than the count of the assertive bits, decision unit 406 produces a de-assertive bit as a decoded output. The output bit from decision unit 406 is a decoded bit that denotes one of the bits of original data stream 102 at the trace-back depth from the current time instant.

Figure 6:
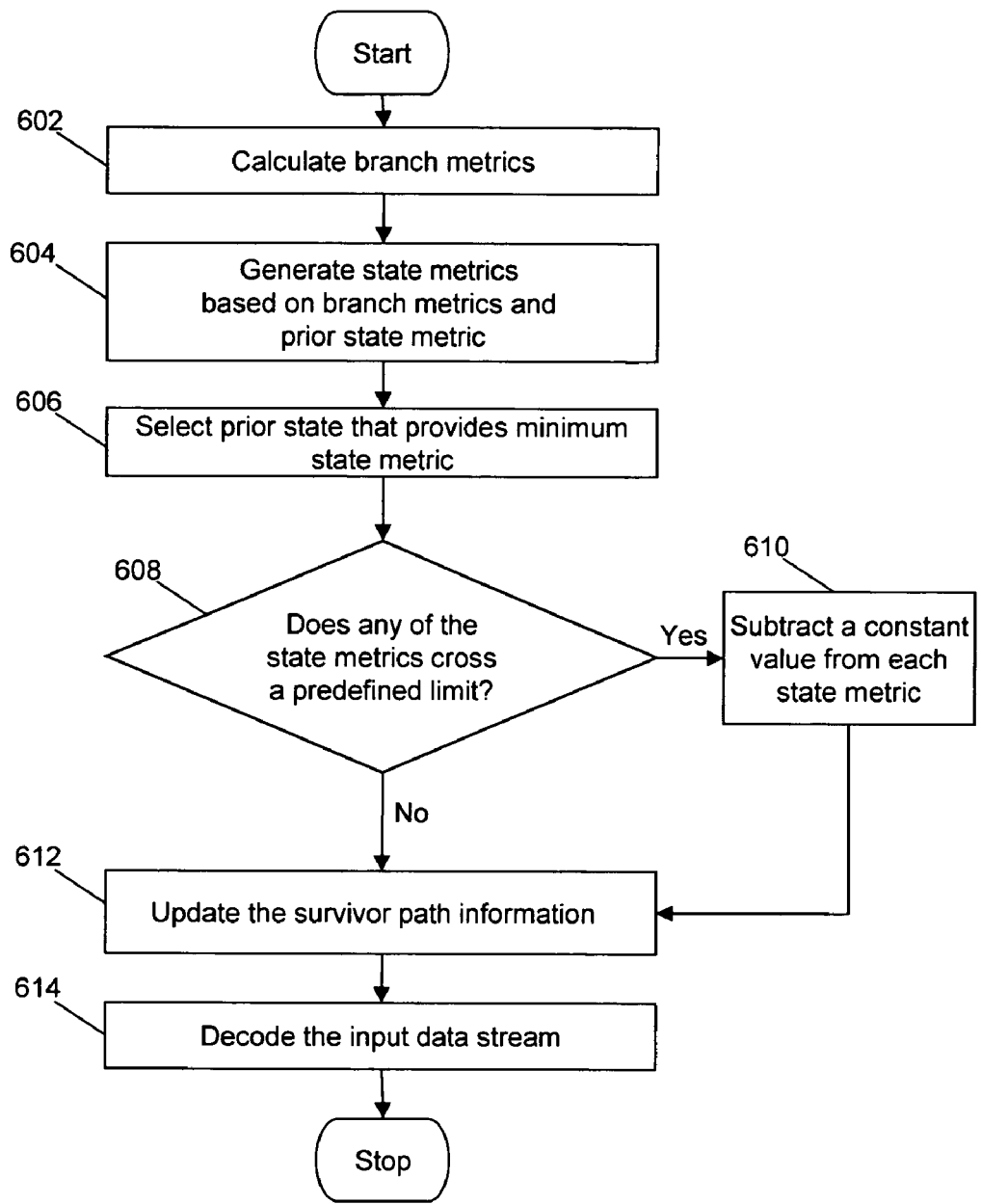
FIG. 6 is a flowchart depicting a method for a Viterbi Decoder providing near optimal decoding, in accordance with an embodiment of the present invention.
Figure 7A:
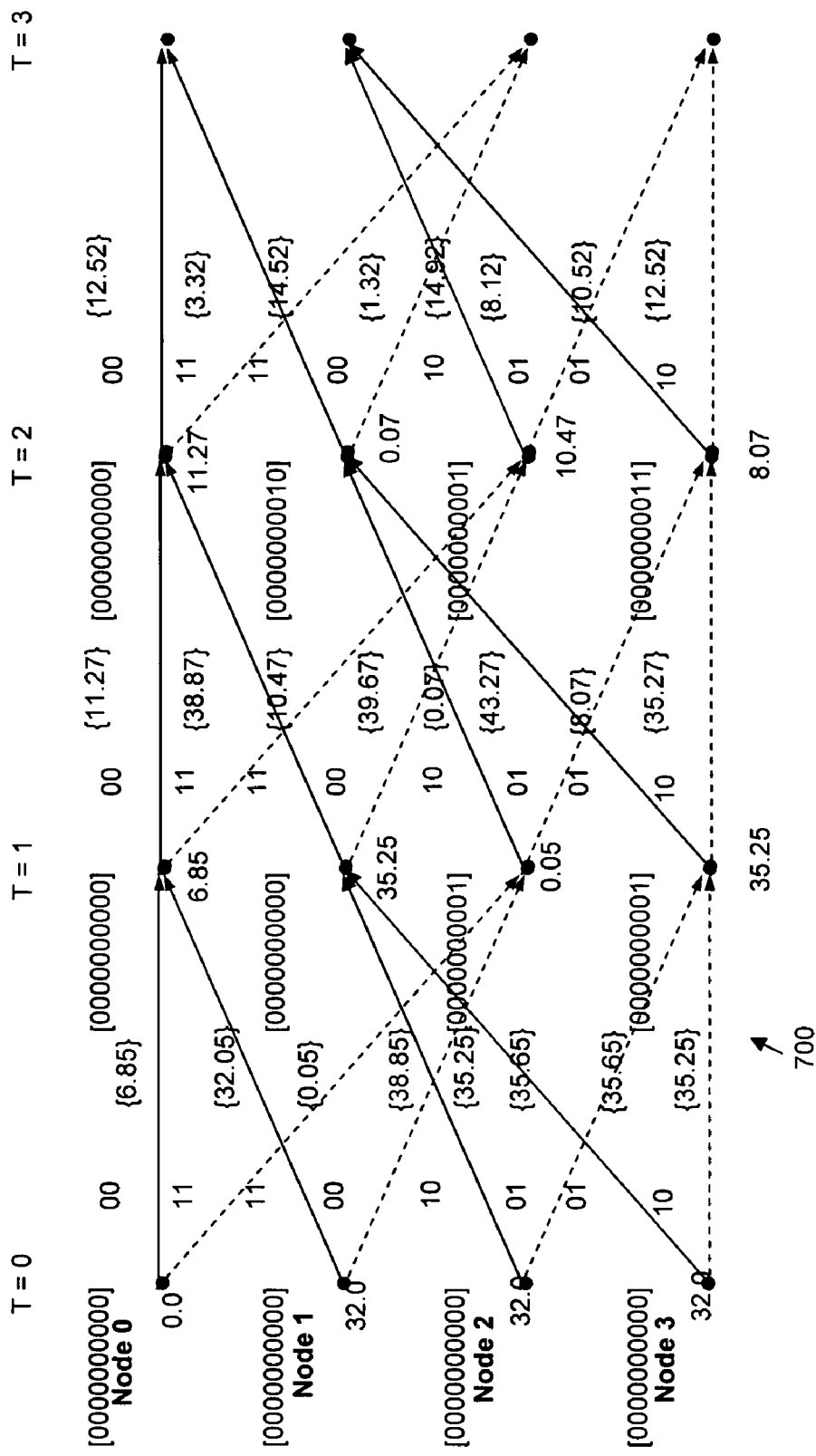
FIGS. 7a, 7b, 7c and 7d depict a trellis illustrating a diagrammatic representation of the method for providing near optimal decoding by a Viterbi Decoder, in accordance with an embodiment of the present invention.
Figure 7B:
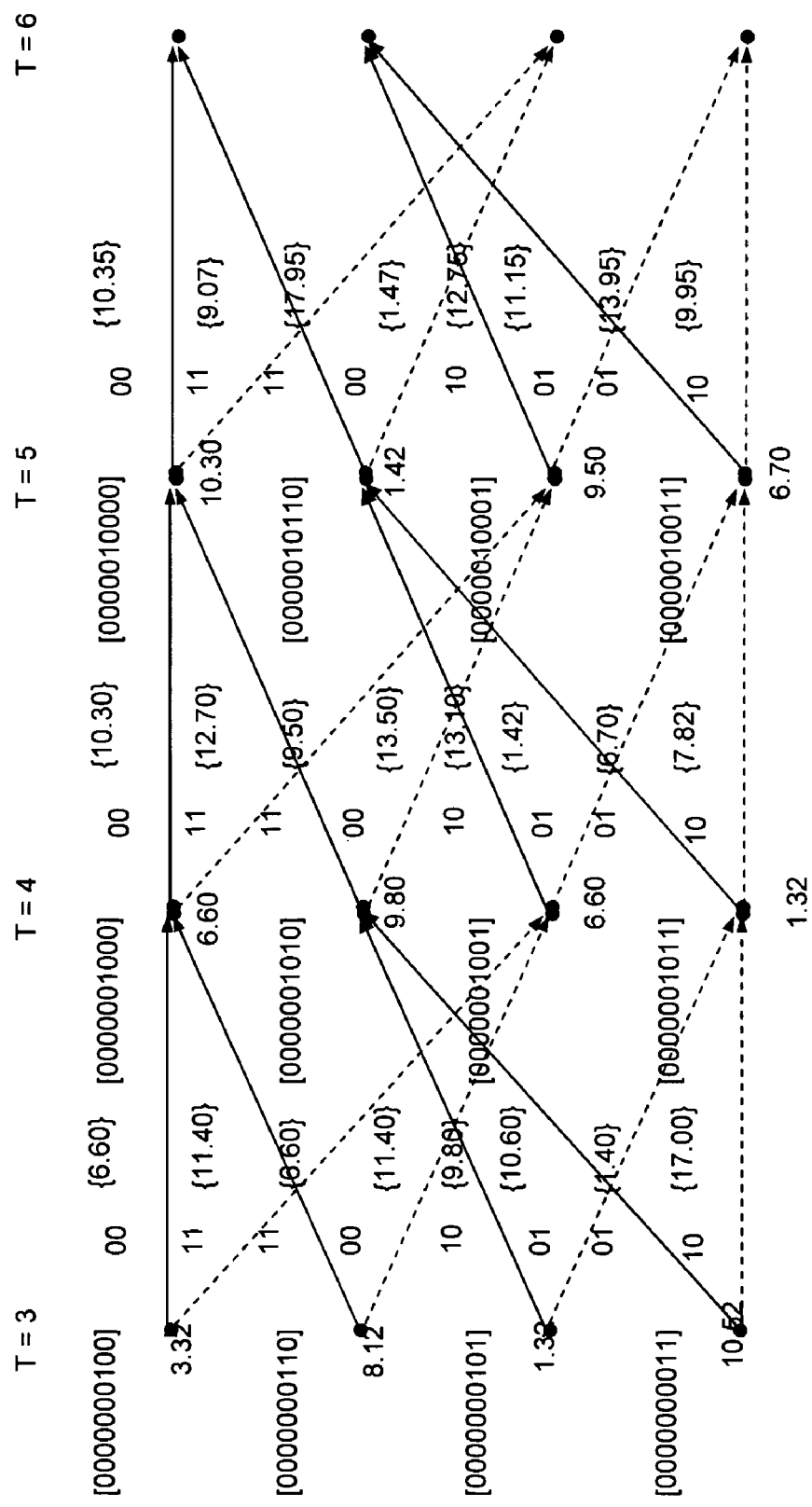
Figure 7C:
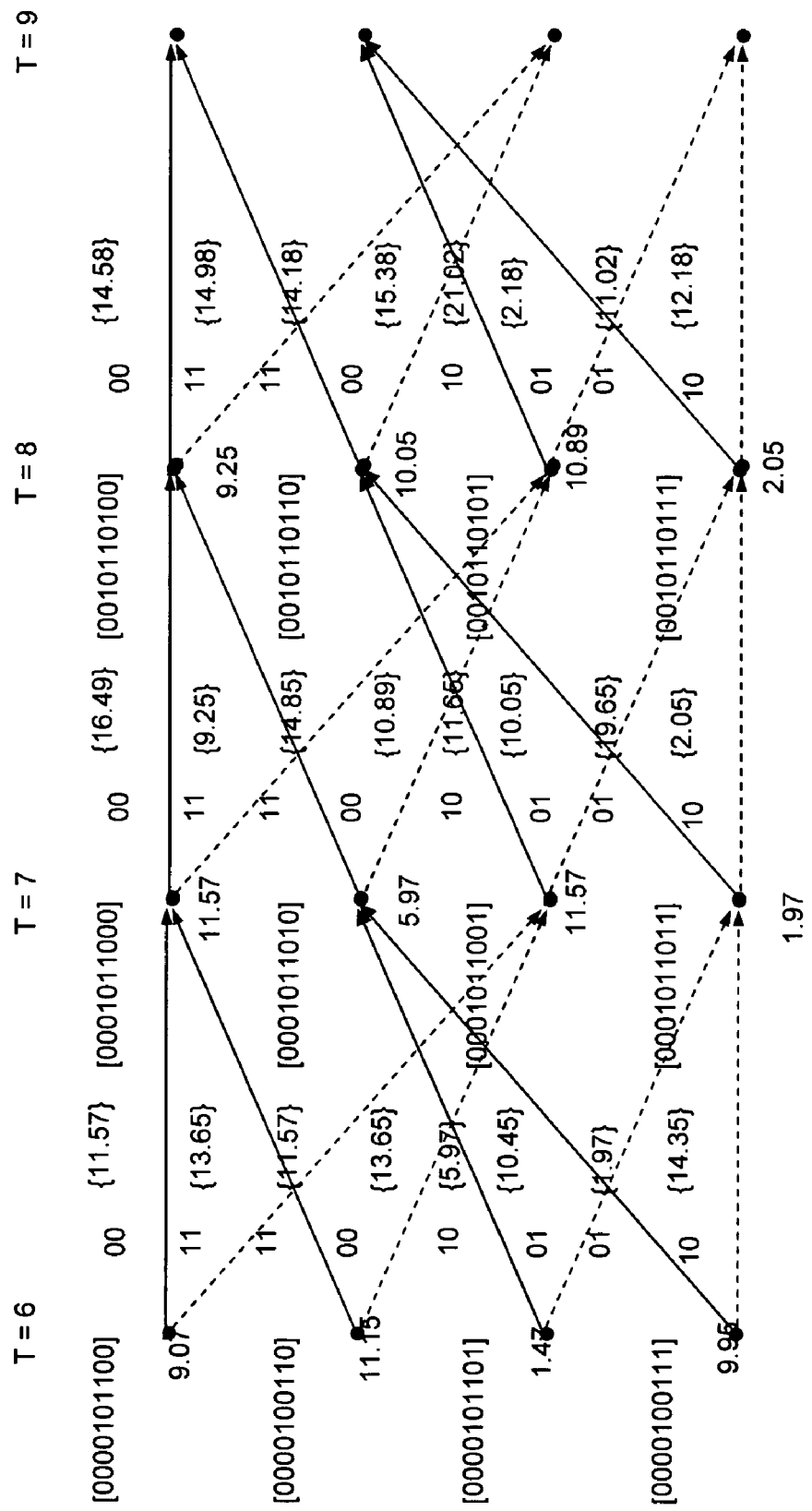
Figure 7D:
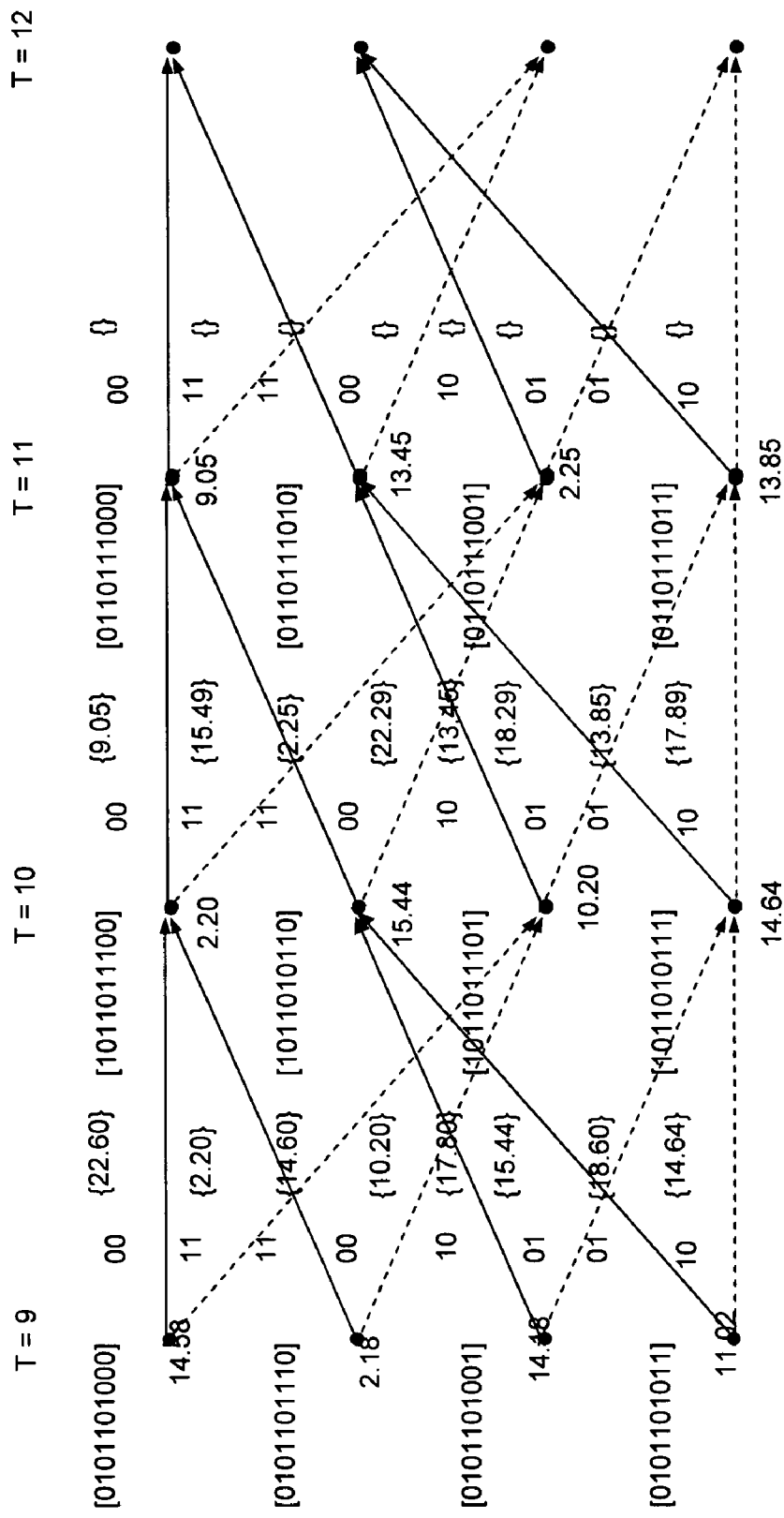

FIG. 6 is a flowchart depicting a method for providing near optimal decoding by Viterbi Decoder 106, in accordance with an embodiment of the present invention. The method will hereinafter be described in conjunction with FIGS. 2, 3, 4 and 5.

At step 602, BMC 402 calculates a branch metric for each transition from a prior state to a next state. The branch metric is calculated on the basis of the state transition. In accordance with an embodiment of the present invention, the branch metric is calculated on the basis of the bit match and the bit mismatch confidence level between a received channel symbol pair and a possible channel symbol pair. For example, the state transition from state '0' at time instant 'n' to state '0' at time instant 'n+1' is assigned a branch metric '$BM^{n,n+1}_{0,0}$' by BMC unit 402, as discussed with reference to FIG. 2.

At step 604, ACSR unit 404 generates a state metric of the current state, based on the combination of the branch metric corresponding to the transition from a prior state to the current state, and the prior state metric value. There can be another transition from another prior state to the current state. Therefore, another state metric value can be generated, based on the combination of the branch metric corresponding to the transition from the second prior state to the current state. As a result, the current state has multiple possible state metrics. Of these possible state metrics, the minimum state metric is selected as the state metric of the current state at step 606. For example, at state '0' at time instant 'n+1', two possible state metrics can be generated, one by combining '$BM_{n,n+10,0}$' and '$SM^n_0$', and the other by combining '$BM^{n,n+1}_{1,0}$' and '$SM^n_1$'. Thereafter, the least of the two possible state metrics is considered as the '$SM^{n+1}_0$' for the state '0' at time instant 'n+1'. Similarly, state metrics are generated for all the states at each time instant.

At step 608, saturation control unit 408 checks whether any state metric crosses a predefined limit at the current time instant. If any state metric crosses the predefined limit, step 610 is performed. If none of the state metrics cross the predefined limit, step 612 is performed.

At step 610, saturation control unit 408 subtracts a constant value from all the state metrics of the current states. In accordance with an embodiment of the present invention, saturation control unit 408 selects the constant value such that the minimum state metric of the current state metrics is greater than or equal to zero, after subtracting the constant value from the minimum state metric.

At step 612, ACSR unit 404 updates the survivor path sequence of the selected prior state with an assertive or de-assertive bit that causes the transition from the prior state to the current state. The updated survivor path sequence becomes the survivor path sequence of the current state. For example, in trellis 200, the state metric '$SM^{n+1}_0$' was selected corresponding to a transition from state '0' at time instant 'n' to state '0' at time instant 'n+1'. The transition corresponds to an input '0', represented by a solid line in trellis 200. Thereafter, the survivor path sequence stored in State Register 504 at time instant 'n+1' is updated with '0'. This updating takes place by inserting the bit at the Least Significant Bit (LSB) position in the state register.

At step 614, decision unit 406 decodes an informational bit of an original data stream 102, based on the majority count of assertive and de-assertive bits in the MSBs of the survivor path sequence of the current states. If the count of the assertive bits is more than the count of the de-assertive bits, the output is an assertive bit. If the count of the de-assertive bits is more than the count of the assertive bits, the output is a de-assertive bit. For example, if the count of '1's in the survivor path sequences of states 0-3 at time instant 'n+3' is more than the count of '0's, '1' is decoded as the bit of original data stream 102 that was encoded earlier at time instant 'n+3−D'. Here, 'D' is the trace-back depth of trellis 200 and 'D' is equal to the length of each of DPR 506a-d.

FIGS. 7a, 7b, 7c and 7d depict a trellis 700 illustrating a diagrammatic representation of the method for implementing near optimal decoding by a Viterbi Decoder, in accordance with an embodiment of the present invention. For the purpose of illustration, let us consider the trellis as a 4-state trellis of a ½-rate convolution encoder. From the top node to the bottom node, the four nodes are numbered 0, 1, 2 and 3. Each node corresponds to a state of the trellis. Branches shown in a dark line and those shown in a dotted line are transitions caused by the '0' and '1' bit input to the convolution encoder, respectively. The binary values shown on the branches indicate the output bit pair of the convolution encoder. The real values shown below each node show the state metric of the respective node. The real values shown in '{ }' braces indicate possible state metric values after the branch metric is added to the prior state metric value. The binary value shown in '[ ]' square brackets represents the data path register corresponding to each state. Each data path register contains decoded bits corresponding to the survivor path sequence and 10 bits corresponding to the survivor path sequence.

At time instant T=0, all data path registers are initialized to zero. Similarly, the state metric of state '0' is considered as zero, since the convolution encoder is starting from the zero$^{th}$ state. The state metrics of the remaining states are considered as reasonably large values, since only branches originating from the zero$^{th}$ state survive.

At time instant T=1, two branches show the transition of each state at T=0 to a corresponding state at T=1. For example, branches reaching state '0' emerge from state '0' and state '1' at T=0, respectively. The possible state metrics of state '0' at T=1 are computed by adding a state metric value of state '0' and state '1' at T=0 to their respective branch metrics. The branch emerging from state '0' at T=0 carries '00' as the possible channel symbol bit pair, whereas the branch emerging from state '1' at T=1 carries '11' as the possible channel symbol bit pair. Branch metrics corresponding to these possible channel symbol bit pairs are computed from the received channel symbol bit pair and the corresponding confidence match and mismatch values that are depicted in branch metrics table 300 of FIG. 3. Thus, the possible state metrics of state '0' at T=1 are (0.0+6.85) and (32.0+0.05), respectively. The two possible state metric values are compared and the prior state, resulting in the minimum state metric, is selected. The data path register of state '0' at T=1 is updated according to the selected prior state and the received single bit input to the convolution encoder. The selected state '0' at T=0 has a data path register value [0000000000]. This data path register value is appended with the input bit, i.e., '0', in the LSB position of the register. Hence, the data path register value of state '0' at T=1 contains [0000000000]. A similar procedure is performed for all the other states at T=1.

Considering state '2', two possible state metrics are '0.05' and '38.85'. Since the least possible state metric is '0.05', state '0' at T=0 is the selected prior state of the current state, i.e., state '2' at T=1. This transition from state '0' to state '2' is caused by the information bit '1' at the input of the convolution encoder. As a result, the data path register value of state '2' at T=1 is updated by appending '1' bit to the data path register of state '0' at T=0. Hence, the data path register value of state '2' at T=1 contains [0000000001].

At time instants T=2, 3 . . . , 9, updating the data path register value and the state metric of each state at all these instants is the same as explained above.

At time instant T=10, 11, . . . , the data path register value and the state metric are updated in the same manner as mentioned above, except that the decoding of the information bit starts from these time instants. At T=10, the data path register becomes full, since it has reached the trace-back depth. Therefore, the MSB bit from all the data path registers is taken and the number of '1' bits and '0' bits are counted from all the MSB bits taken from the data path registers. If the '1' bit count is more than the '0' bit count, the decoded bit is '1'. Otherwise, the decoded bit is '0'. The decoded bit is the same as the original bit that was encoded and received by the convolution encoder at T=0, i.e., 10 time instants earlier.

Figure 8:
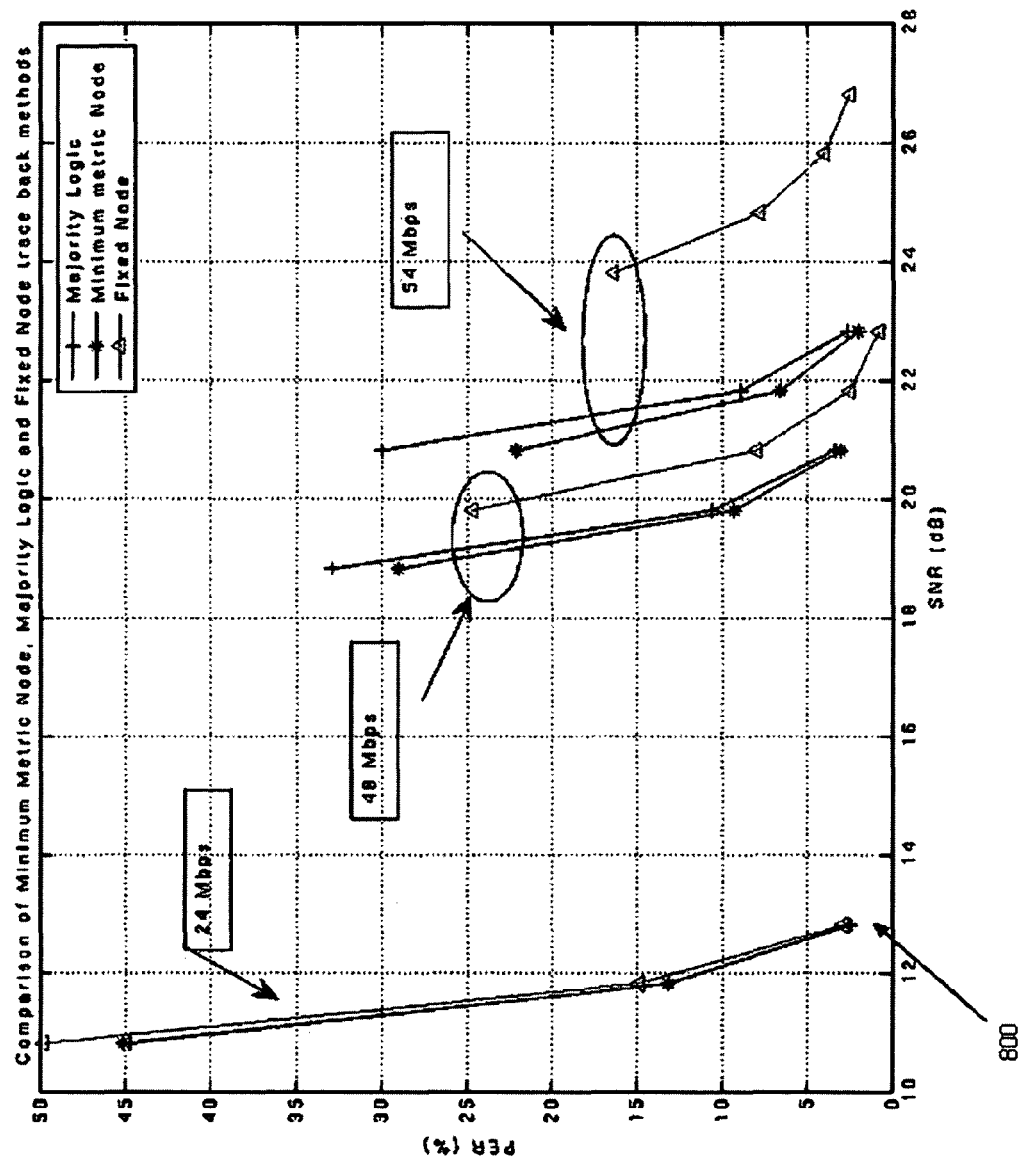
FIG. 8 is a graphical representation of a comparison of Packet Error Rate (PER) performance among the minimum metric node decoding method, fixed node trace back decoding method and proposed decoding method, in accordance with various embodiments of the present invention.

FIG. 8 is a graphical representation 800 of a comparison of Packet Error Rate (PER) performance among the minimum metric node decoding method, the fixed node trace-back method and the proposed decoding method, in accordance with various embodiments of the present invention. The PER performance results for three decoding methods are at various test conditions. These test conditions include the 24 Mbps (½ rate), the 48 Mbps (⅔ rate) and the 54 Mbps (¾ rate) data rates of IEEE 802.11a, Additive White Gaussian Noise (AWGN) channel with typical carrier and clock offset, High Power Amplifier (HPA) non-linearity, and Phase noise and IQ imbalance. These simulation results are obtained with a trace-back depth of '64'. The results show that there is no degradation in the PER performance of the proposed decoding method, as compared to the minimum metric node method. On the other hand, the fixed node method keeps the trace-back depth the same as that in the other two methods. Hence, the fixed node method has a performance penalty of a ⅔ puncture rate and a ¾ puncture rate. To eliminate this degradation in the fixed node method, the trace-back depth needs to be increased to '91', which increases latency, as compared to the decoding method, as well as the resources required for the fixed node method.

Various embodiments of the present invention provide the implementation of a Viterbi Decoder with near optimal performance. Near optimal performance is achieved by the decoded results that are close to the theoretical results of Viterbi decoding.

Various embodiments of the present invention provide a decoding method with minimum latency. The decoding method starts decoding after a finite interval of time. Therefore, a finite minimum latency is achieved.

Various embodiments of the present invention provide a Viterbi Decoder that utilizes minimal resources. The Viterbi Decoder utilizes a register storing technique that performs decoding without using comparators. Additionally, the finite trace-back depth limits the other resources required to process the Viterbi decoding technique because decoding starts after a definite trace-back depth.

Various embodiments of the present invention provide a method for the low-complexity implementation of the Viterbi decoding method. It will be evident to any person of ordinary skill in the art that hard decisions in Viterbi decoding embodiments can be implemented as small circuits in a hardware architecture using efficient Digital Signal Processing (DSP) instructions.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for decoding an input data stream, the input data stream being encoded using the convolution encoding technique, the convolution encoding technique being represented in the decoding method as a trellis, the trellis having a set of states, each state including a survivor path sequence that stores information associated with a transition from a predefined number of prior states to a next state, each prior state having a respective prior state metric, the method comprising the steps of:
 a. calculating a plurality of branch metrics from the input data stream based on a predetermined criterion, each branch metric being a value associated with the transition from a prior state to the next state;
 b. generating a state metric for each current state based on the plurality of branch metrics;
 c. checking the state metric for each current state, the state metric being checked for crossing a predefined limit;
 d. updating the state metric for each current state with a new metric if at least one of the state metrics crosses the predefined limit, wherein the new metric is obtained by subtracting a constant value from the state metric;
 e. selecting one of the prior states that provides a minimum state metric for each current state;
 f. updating the survivor path sequence of the current state, the survivor path sequence being updated based on the information associated with the transition from the selected one of the prior states to the current state; and
 g. decoding the input data stream at one of the sets of the prior states, the decoding being performed based on a count of assertive and de-assertive bits in the Most Significant Bits (MSBs) of the survivor path sequences of a set of current states, the one of the sets of prior states being present at a pre-determined time interval from the set of the current state.

2. The method of claim 1, wherein the step of updating the survivor pathsequence comprises the step of inserting an information bit to the survivor pathsequence of the selected prior state to form the survivor path sequence of the current state, the inserted information bit corresponding to the transition from the selected prior state to the current state.

3. The method of claim 1, wherein the step of decoding the input data stream comprises the step of providing a decoder output as an assertive bit if the majority count of the assertive bits is determined in the MSBs of the survivor path sequences of the set of current states.

4. The method of claim 3, wherein the assertive bit is a binary '1'.

5. The method of claim 1, wherein the step of decoding the input data stream comprises the step of providing the decoder output as a de-assertive bit if the majority count of the de-assertive bits is determined in the MSBs of the survivor path sequences of the set of current states.

6. The method of claim 5, wherein the de-assertive bit is a binary '0'.

7. A decoder for decoding an input data stream, the input data stream being encoded using the convolution encoding technique, the convolution encoding technique being represented in the decoder as a trellis, the trellis having a set of states, each state including a survivor path sequence that stores information associated with a transition from a predefined number of prior states to a next state, each state having a respective state metric, the decoder comprising:
 a. a branch metric computation unit for calculating a plurality of branch metrics from the input data stream based on a pre-determined criterion, each branch metric being a value associated with the transition from a prior state to a next state;
 b. an add-compare-select and register exchange (ACSR) unit for performing a pre-determined set of operations on the plurality of branch metrics, the ACSR unit storing informational bits corresponding to the survivor path sequence for a current state;
 c. a saturation control unit for updating the state metric for each current state with a new metric if at least one of the state metrics crosses a predefined limit, wherein the new metric is obtained by subtracting a constant value from the state metric; and
 d. a decision unit for decoding the input data stream at one of sets of prior states based on a count of assertive and de-assertive bits in the Most Significant Bits (MSBs) of survivor path sequences of a set of current states, the one of the sets of prior states being present at a pre-determined time interval from the set of the current state.

8. The decoder of claim 7, wherein the ACSR unit comprises:
 a. an add-compare-select (ACS) unit for performing the predetermined set of operations on the plurality of branch metrics; and
 b. a plurality of register exchange units for storing the information bits corresponding to the survivor path sequence of the current state.

9. The decoder of claim 8, wherein the ACS unit comprises:
 a. a plurality of add units, each add unit adding a prior state metric to a respective branch state metric defined for the transition from the prior state to the current state;
 b. a plurality of compare units, each compare unit determining a minimum state metric for a current state, the determined minimum state metric being assigned as a prior state metric for the current state; and
 c. a select unit for selecting the prior state that provides the minimum state metric to the current state.

10. The decoder of claim 8, wherein at least one of the plurality of register exchange units updates the survivor path sequence for the current state, the survivor path sequence being updated based on the insertion of an information bit to the survivor path sequence of a selected prior state to form the survivor path sequence of the current state, the selected prior state being selected by the ACS unit, the inserted information bit corresponding to the transition from the selected prior state to the current state.

11. The decoder of claim 7, wherein the decision unit provides a decoder output as an assertive bit based on the majority count of the assertive bits in the MSBs of the survivor path sequences of the set of current states.

12. The decoder of claim 7, wherein the decision unit provides a decoder output as a de-assertive bit based on the majority count of the de-assertive bits in the MSBs of the survivor path sequences of the set of current states.

13. A decoder for decoding an input data stream, the input data stream being encoded using the convolution encoding technique, the convolution encoding technique being represented in the decoder as a trellis, the trellis having a set of states, each state including a survivor path sequence that stores information associated with a transition from a predefined number of prior states to a next state, each state having a respective state metric, the decoder comprises:
 a. means for calculating a plurality of branch metrics from the input data stream based on a pre-determined criterion, each branch metric being a value associated with the transition from a prior state to the next state;
 b. means for computing, wherein the means for computing perform a pre-determined set of operations on the plurality of branch metrics, the computing means storing informational bits corresponding to the survivor path sequence for a current state; and
 c. means for deciding to decode the input data stream at one of sets of prior states based on a count of assertive and de-assertive bits in the Most Significant Bits (MSBs) of survivor path sequences of a set of current states, the one of the sets of prior states being present at a pre-determined time interval from the set of the current state.

14. The decoder of claim 13, wherein the means for computing comprises:
   a. means for performing the predetermined set of operations on the plurality of branch metrics; and
   b. means for storing the information bits corresponding to the survivor path sequence of the current state.

15. The decoder of claim 13, wherein the means for calculating comprises:
   a. means for adding a prior state metric to a respective branch state metric defined for the transition from the prior state to the current state;
   b. means for comparing to determine a minimum state metric for a current state, the determined minimum state metric being assigned as a prior state metric for the current state; and
   c. means for selecting the prior state that provides the minimum state metric to the current state.

16. A method for decoding an input data stream, the input data stream being encoded using the convolution encoding technique, the convolution encoding technique being represented in the decoding method as a trellis, the trellis having a set of states, each state including a survivor path sequence that stores information associated with a transition from a pre-defined number of prior states to a next state, each prior state having a respective prior state metric, the method comprising the steps of:
   a. calculating a plurality of branch metrics from the input data stream based on a predetermined criterion, each branch metric being a value associated with the transition from a prior state to the next state;
   b. generating at least one state metric for a current state based on the plurality of branch metrics by adding a prior state metric to a branch metric defined for a transition from the prior state to the current state;
   c. checking the state metric for each current state for crossing a predefined limit;
   d. subtracting a constant value from each state metric if at least one of the state metrics crosses the predefined limit;
   e. updating the state metric corresponding to each current states with a new metric, wherein the new metric is obtained by subtracting the constant value from the respective state metric;
   f. selecting one of the prior states that provides a minimum state metric for the current state;
   g. updating the survivor path sequence of the current state, the survivor path sequence being updated based on the information associated with the transition from the selected one of the prior states to the current state; and
   h. decoding the input data stream at one of sets of prior states, the decoding being performed based on a count of assertive and de-assertive bits in the Most Significant Bits (MSBs) of the survivor path sequences of the set of current states, the one of the sets of prior states being present at a pre-determined time interval from the set of the current state.

17. A method for decoding an input data stream, the input data stream being encoded using the convolution encoding technique, the convolution encoding technique being represented in the decoding method as a trellis, the trellis having a set of states, each state including a survivor path sequence that stores information associated with a transition from a pre-defined number of prior states and a next state, each prior state having a respective prior state metric, the method comprising the steps of:
   a. checking a state metric corresponding to each current state for crossing a predefined limit;
   b. subtracting a constant value from each current state metric if at least one of the state metrics crosses the predefined limit;
   c. updating the state metric for each current state with a new metric, wherein the new metric is obtained by subtracting the constant value from the state metric;
   d. updating the survivor path sequence of each state based on a predetermined criteria, wherein the predetermined criteria uses the current state metrics; and
   e. decoding the input data stream at one of sets of prior states, the decoding being performed based on a count of assertive and de-assertive bits in the Most Significant Bits (MSBs) of the survivor path sequences of the set of current states, the one of a sets of prior states being present at a pre-determined time interval from the set of the current state.

18. The method of claim 17, wherein the step of decoding the input data stream comprises the step of providing a decoder output as an assertive bit if the majority count of the assertive bits is determined in the MSBs of the survivor path sequences of the set of current states.

19. The method of claim 17, wherein the step of decoding the input data stream comprises the step of providing the decoder output as a de-assertive bit if the majority count of the de-assertive bits is determined in the MSBs of the survivor path sequences of the set of current states.

* * * * *